US012747818B2

(12) United States Patent
van den Brule et al.

(10) Patent No.: US 12,747,818 B2
(45) Date of Patent: Sep. 29, 2026

(54) OFFSHORE RENEWABLE ENERGY SUBSEA HEAT BANK

(71) Applicant: Salamander IP Holdings LLC, Hamilton (BM)

(72) Inventors: Bernardus van den Brule, Houston, TX (US); Robert Michael Rainey, Cypres, TX (US); John Michael Karanikas, Houston, TX (US)

(73) Assignee: Salamander IP Holdings LLC, Hamilton (BM)

( * ) Notice: Subject to any disclaimer, the term of this patent is extended or adjusted under 35 U.S.C. 154(b) by 916 days.

(21) Appl. No.: 18/063,905

(22) Filed: Dec. 9, 2022

(65) Prior Publication Data

US 2024/0191823 A1 Jun. 13, 2024

(51) Int. Cl.
*F16L 53/38* (2018.01)

(52) U.S. Cl.
CPC .................................... *F16L 53/38* (2018.01)

(58) Field of Classification Search
CPC ...... F03D 9/255; F05B 2240/95; F16L 53/30; F16L 53/38
USPC .......................................................... 392/478
See application file for complete search history.

(56) References Cited

U.S. PATENT DOCUMENTS 6,205,291 B1 * 3/2001 Hughes ............... F24D 19/0092 392/457
6,564,011 B1 * 5/2003 Janoff ..................... F16L 53/38 392/479
8,562,562 B2 * 10/2013 Walter .................... A61M 5/44 604/113
10,398,624 B2 * 9/2019 Authier .............. A61H 33/0095
11,359,823 B2 * 6/2022 Zhang ................... F24H 15/219
2004/0020642 A1 * 2/2004 Vinegar .............. E21B 47/0224 166/245
2009/0173336 A1 * 7/2009 Leifer .................. F28D 20/021 165/104.11

(Continued)

FOREIGN PATENT DOCUMENTS

CN 114484132 9/2022
WO 2010/135772 12/2010

(Continued)

OTHER PUBLICATIONS

Patent Cooperation Treaty, PCT/US2023/081273, International Search Report and Written Opinion, Mar. 14, 2024.

*Primary Examiner* — Steven W Crabb
*Assistant Examiner* — Ket D Dang
(74) *Attorney, Agent, or Firm* — Jones Day

(57) ABSTRACT

Systems and methods are provided for storing excess heat from subsea flowlines. The methods described herein may include generating power from a renewable energy source; heating one or more heater cables surrounding a subsea flowline with the power from the renewable energy source to a temperature at least a threshold above a temperature necessary to prevent hydrate or wax formation within the subsea flowline; storing excess heat generated by the one or more heater cables in the seafloor; and decreasing a heat loss of the subsea flowline with the excess heat generated by the one or more heater cables when the power from the renewable energy source is insufficient to heat the one or more heater cables to the temperature necessary to prevent hydrate or wax formation within the subsea flowline.

20 Claims, 8 Drawing Sheets

(56) References Cited

U.S. PATENT DOCUMENTS

| | | | | |
|---|---|---|---|---|
| 2010/0181780 | A1 * | 7/2010 | Gillett | F03D 3/002 290/1 R |
| 2014/0376900 | A1 | 12/2014 | Bjerknes et al. | |
| 2017/0122477 | A1 | 5/2017 | Viellard et al. | |
| 2017/0159866 | A1 | 6/2017 | Glejbel | |
| 2018/0030958 | A1 * | 2/2018 | Sant | F03D 9/28 |
| 2022/0213764 | A1 | 7/2022 | Loentgen | |
| 2022/0275898 | A1 | 9/2022 | Strupinsky | |
| 2024/0068434 | A1 * | 2/2024 | Podhola | F03B 13/1815 |

FOREIGN PATENT DOCUMENTS

| | | | | |
|---|---|---|---|---|
| WO | WO-2010135772 | A1 * | 12/2010 | F16L 53/37 |
| WO | 2018/231562 | | 12/2018 | |
| WO | 2021/160562 | | 8/2021 | |

* cited by examiner

OFFSHORE RENEWABLE ENERGY SUBSEA HEAT BANK

TECHNICAL FIELD

The technology described in this patent document relates generally to flowlines of natural gas and crude oil applications.

BACKGROUND

Subsea flowlines are commonly implemented in natural gas and crude oil well environments that can facilitate transporting gas and oil mixtures from a well underneath a sea to a particular location. Available flowlines may operate at a temperature in which hydrate or wax deposits can form within the natural gas or crude oil mixture. There is therefore a need for a flowline that operates at a temperature in which hydrate or wax formation is reduced or prevented.

SUMMARY

Embodiments of the present disclosure include a system. In some example embodiments, the system includes a renewable energy source configured to generate electrical power; a subsea flowline buried underneath a seafloor; and one or more heater cables surrounding the subsea flowline. The one or more heater cables may be configured to receive the electrical power from the renewable energy source and to heat the subsea flowline to a temperature at least a threshold above a temperature necessary to prevent hydrate or wax formation within the subsea flowline, the heating of the subsea flowline based on the electrical power; and store excess heat generated by the one or more heater cables in the seafloor, the excess heat based on heating the subsea flowline to the temperature above the temperature necessary to prevent hydrate or wax formation, the excess heat decreasing a heat loss of the subsea flowline when the power from the renewable energy source is insufficient to heat the one or more heater cables to the temperature necessary to prevent hydrate or wax formation within the subsea flowline.

The one or more heater cables may be further configured to limit the temperature of the one or more heater cables to a minimum predetermined temperature that damages the subsea flowline. The system may further comprise a sensor configured to generate an alert signal that is based on a determination that the renewable energy source is not supplying the power necessary to heat the one or more heater cables to a temperature at least the threshold above a temperature necessary to prevent hydrate or wax formation within the subsea flowline. In some example embodiments, the renewable energy source comprises a wind turbine. In other example embodiments, the renewable energy source comprises a solar panel. The subsea flowline may comprise a hollow region configured to transport natural gas or crude oil, a pipe surrounding the hollow region, and a coating surrounding the pipe that is configured to prevent corrosion of the pipe. The pipe may be a carbon steel pipe. The system may further comprise thermal insulation surrounding the subsea flowline.

Embodiments of the present disclosure include a method of storing excess heat for subsea flowlines. In some examples, the method includes steps of burying a subsea flowline beneath an ocean floor surface; surrounding the subsea flowline with one or more heater cables; generating power from a renewable energy source; heating the one or more heater cables with the power from the renewable energy source to a temperature at least a threshold above a temperature necessary to prevent hydrate or wax formation within the subsea flowline; storing excess heat generated by the one or more heater cables in the ocean floor; and decreasing a heat loss of the subsea flowline with the excess heat generated by the one or more heater cables.

In some example embodiments, the method further comprises limiting the temperature of the one or more heater cables to a minimum predetermined temperature that damages the subsea flowline. The method may further comprise detecting that the renewable energy source is not supplying the power necessary to heat the one or more heater cables to a temperature at least the threshold above the temperature necessary to prevent hydrate or wax formation. In some example embodiments, the renewable energy source comprises a wind turbine. In other example embodiments, the renewable energy source comprises a solar panel. The subsea flowline may comprise a hollow region configured to transport natural gas or crude oil, a pipe surrounding the hollow region, and a coating surrounding the pipe that is configured to prevent corrosion of the pipe. The pipe may be a carbon steel pipe. Thermal insulation may surround the subsea flowline. The one or more heater cables may comprise a core, insulation surrounding the core, and an outer sheath. The insulation surrounding the core may comprise magnesium oxide. In some example embodiments, the method further comprises placing a gap between the one or more heater cables and the subsea flowline.

BRIEF DESCRIPTION OF THE DRAWINGS

Aspects of the present disclosure are best understood from the following detailed description when read with the accompanying figures.

DETAILED DESCRIPTION

Figure 1:
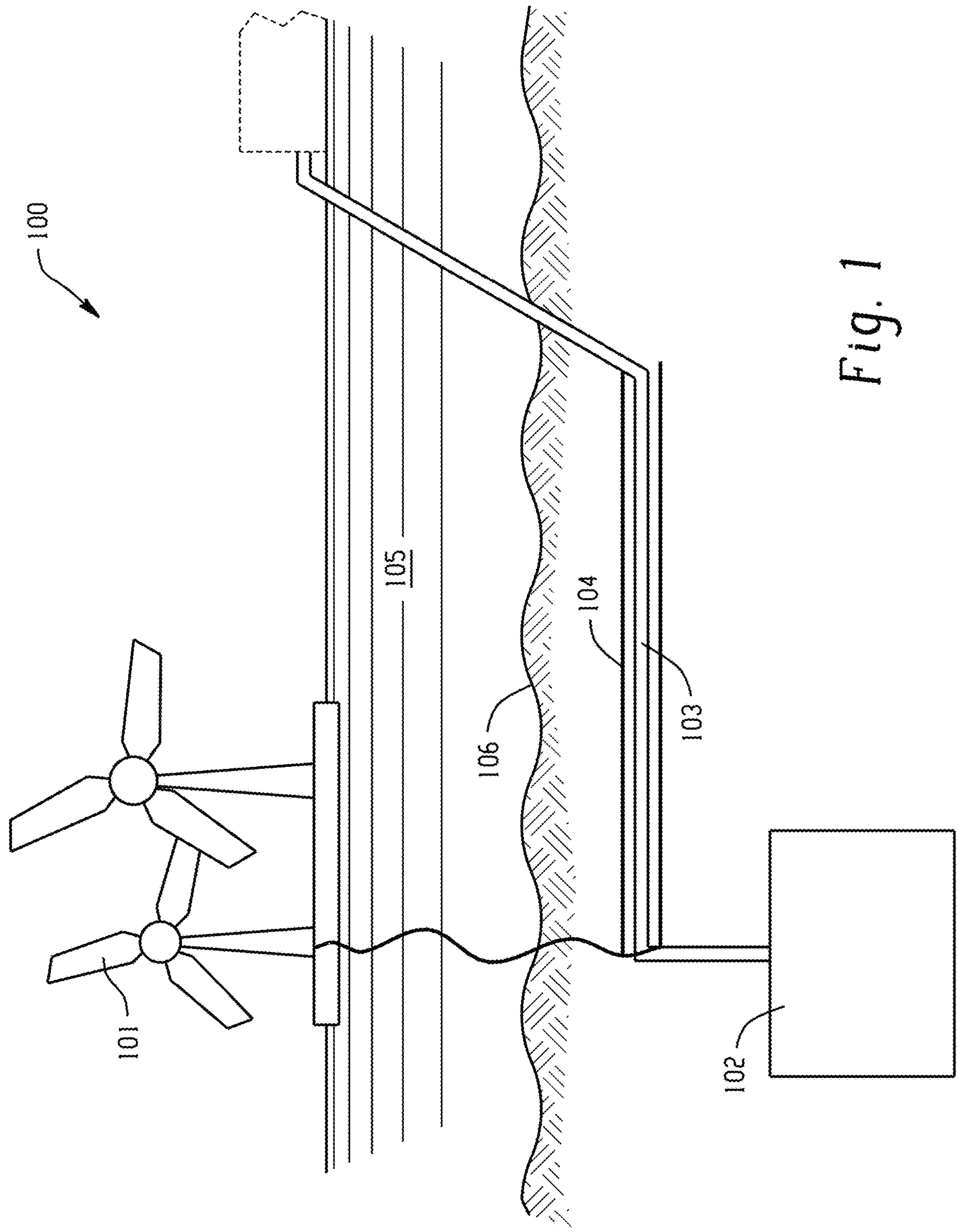
FIG. 1 depicts a subsea heat-banking system, in accordance with some embodiments.

The following disclosure provides many different embodiments, or examples, for implementing different features of the provided subject matter. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts a subsea heat-banking system 100, in accordance with some embodiments. In the example embodiment depicted in FIG. 1, the subsea heat-banking system 100 includes a renewable energy source 101. A wind turbine is shown as the renewable energy source in FIG. 1. However, solar panels or other systems utilizing renewable energy may be implemented as the renewable energy source 101 within the subsea heat-banking system 100 in other example embodiments that are within the spirit and scope of the present disclosure. The renewable energy source 101 may be stationed on a structure at the surface of a sea 105, for example on a floating dock.

The subsea heat-banking system 100 may further include a crude oil well 102. In some example embodiments, a natural gas well (not shown) may be utilized within the heat-banking system 100 rather than a crude oil well 102. The crude oil well may be located beneath a seafloor 106 and may be coupled to a subsea flowline 103 that is located beneath a surface of the seafloor 106. Fluid (e.g., crude oil from the crude oil well 102) may be pumped to flow through the subsea flowline 103 to be processed. The subsea flowline 103 may be vertical or horizontal in differing example embodiments.

The subsea heat-banking system 100 may further include one or more heater cables 104 that are coupled to the renewable energy source 101. The renewable energy source 101 may receive power from a renewable input source (e.g., wind or the sun) and generate electrical power which the heater cables 104 can use to generate heat. The heater cables 104 may surround the subsea flowline 103 to heat the fluid within the subsea flowline 103. Heating the fluid may be effective in eliminating or reducing the presence of hydrates or wax, which typically form at lower temperatures. Reducing the presence of hydrates or wax from the fluid is beneficial for production purposes because hydrates or wax can reduce or even stop the flow of fluid within the subsea flowline 103, which can result in reduced profits. As further described herein, the heater cables 104 may be strategically overheated in order to store heat in the seafloor 106 surrounding the heater cables 104 and subsea flowline 103 that can subsequently be used to slow the flow of heat from the subsea flowline 103 to the seafloor 106. The power delivered to the heater cables 104 can further be controlled such that they do not damage the subsea flowline 103 or do not overheat the fluid within the subsea flowline 103. Thus, the subsea heat-banking system 100 may include electrical components such as one or more controller or switch (not shown) coupled to the heater cables 104 that are utilized to control the heater cables 104 according to the methods described herein.

Figure 2:
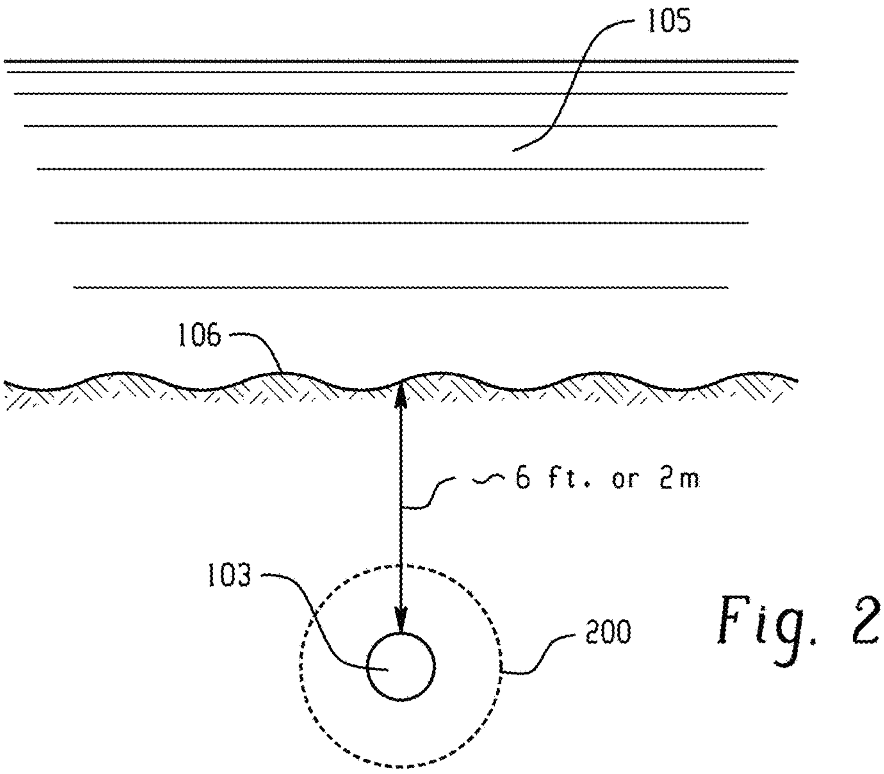
FIG. 2 depicts the heating system within the subsea heat-banking system, in accordance with some embodiments.

FIG. 2 depicts the heating system 200 within the subsea heat-banking system 100, in accordance with some embodiments. In the example embodiment shown in FIG. 2, the heating system 200 is implemented within the seafloor 106, which is located under the sea 105. For purposes of the present disclosure, "sea" means any body of water including oceans, lakes, or rivers. "Seafloor" includes the ground beneath the sea. The flowline 102 may be buried at any depth below the seafloor 106, with the burial depth normally expressed as a multiple of flowline diameter and determined by a tradeoff based on the advantages and disadvantages of shallow depth and deeper depth. For example, a shallow depth may have the benefit of low burial costs and the disadvantage of a high long-term loss of heat to the sea. In contrast, burying the flowline deeper within the seafloor 106 may include high burial costs but a lower long-term heat loss to the sea. For typical ranges of thermal properties of the seafloor 106 (e.g., thermal conductivity between 0.75 and 1.50 W/m×K) and subsea flowline 103 diameter (e.g., nominally 8 to 12 inches), an economically optimal depth of burial below the seafloor surface may be approximately 6 feet (2 meters), or approximately 4 to 6 flowline diameters.

Figure 3:
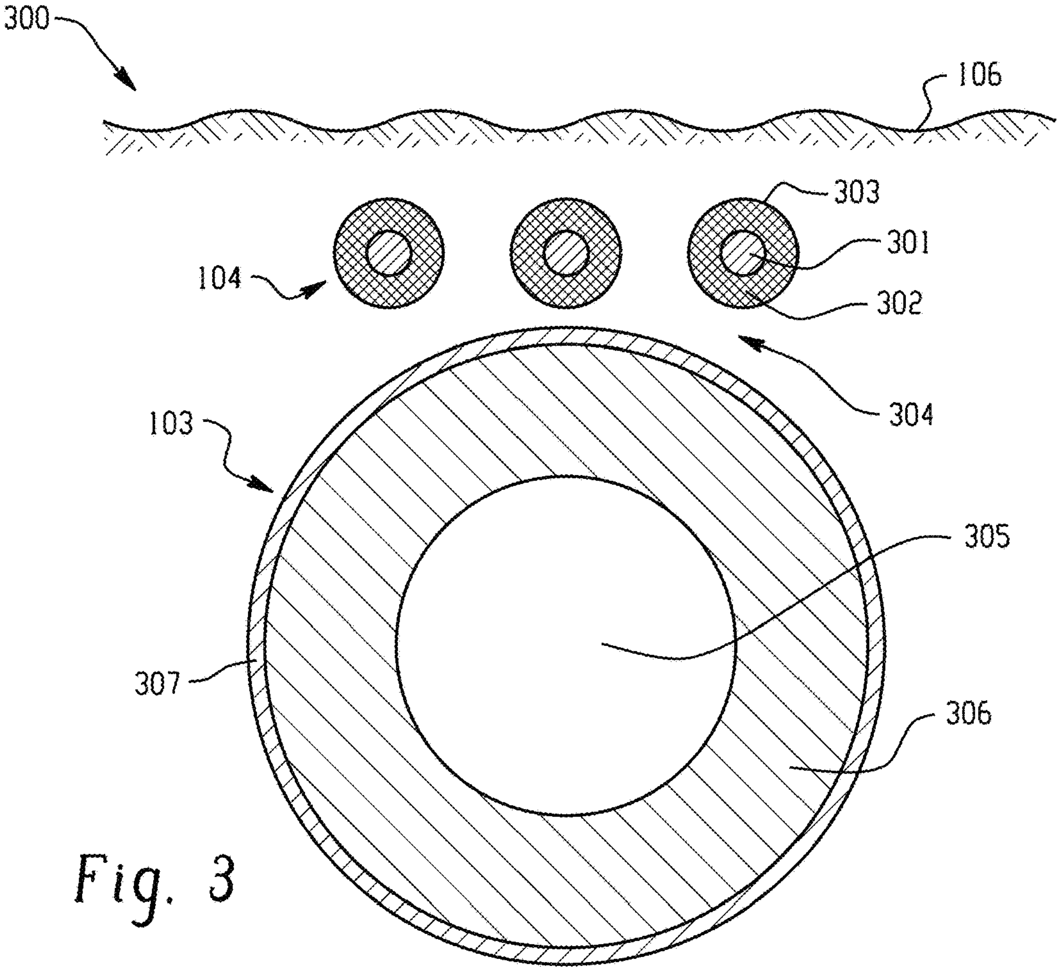
FIG. 3 depicts a subsea flowline and surrounding heater cables, in accordance with some embodiments.

FIG. 3 depicts a subsea flowline 103 and surrounding heater cables 104, in accordance with some embodiments. As depicted in FIG. 3, the heater cables 104 may include a core 301, an insulating layer 302, and an outer sheath 303. The insulating layer 302 may include, for example, magnesium oxide. The core 301 and outer sheath 303 may include material that emits heat when electric current passes through it (e.g., a copper-nickel alloy). A gap 304 may be placed between the heater cables 104 and the subsea flowline 103. The size of the gap 304 may be strategically chosen to optimize the control of the heat delivered to the subsea flowline 103 and the excess heat stored in the seafloor 106.

As depicted in FIG. 3, the subsea flowline 103 may include a hollow region 305 through which the crude oil or natural gas flows, a pipe 306, and a protective coating 307 surrounding the pipe 306. Water, hydrate, or wax may also accumulate in the hollow region 305, which can slow or stop the flow of the crude oil or natural gas. The pipe 306 may be, for example, a carbon steel pipe. The material used as the protective coating 307 may be chosen to prevent corrosion, for example. The subsea flowline 103 and heater cables 104 and their corresponding components are not necessarily drawn to scale in FIG. 3. A heater assembly may, for example, include four cables with the fourth cable being a spare that may be energized in the event of a failure of any of the other three cables.

When using conventional power sources (e.g., power from fossil fuels), overheating heater cables is impracticable due to cost and efficiency concerns. For example, overheating heater cables beyond the level necessary to prevent or remove hydrate or wax from subsea flowlines is wasteful and increases the cost of power used. In contrast, these cost and efficiency concerns are not applicable to the renewable energy source 101 utilized in the systems and methods of the present application. Therefore, with the systems and methods disclosed herein the heater cables 104 can be used to overheat the subsea flowline 103 to a temperature at least a threshold level above the temperature necessary to prevent or remove hydrate or wax. It would be impractical to heat the heater cables 104 to this temperature at least a threshold above the temperature necessary to prevent or remove hydrate or wax when using power from fossil fuels because of the cost and efficiency concerns described above.

In some example embodiments, the heater cables 104 must be heated to temperatures that are high enough to build a sufficient thermal gradient (e.g., temperature difference) between the cables and the flow area. The temperature difference can be in a range of approximately 10-120° F., while the absolute value of the heater cable temperature may depend on the properties of hydrate or wax that have formed within the flowline. Hydrates may typically form in the range of 70 to 80° F. Thus, the cable temperature may be heated to the range of 80 to 200° F. Wax may typically form in the range of 80 to 95° F., and thus the cable temperature may be heated to the range of 90 to 215° F. To expedite the remediation process, it may be advantageous to increase the thermal gradient by raising the heater cable temperature to a highest allowable value. This upper limit may be dictated by the properties of the cable (e.g., the dielectric limit of the insulating layer 302) or by the upper thermal limit of protective coating 307 or by the operating limit of thermal insulation that may surround the flowline (not shown).

Figure 4:
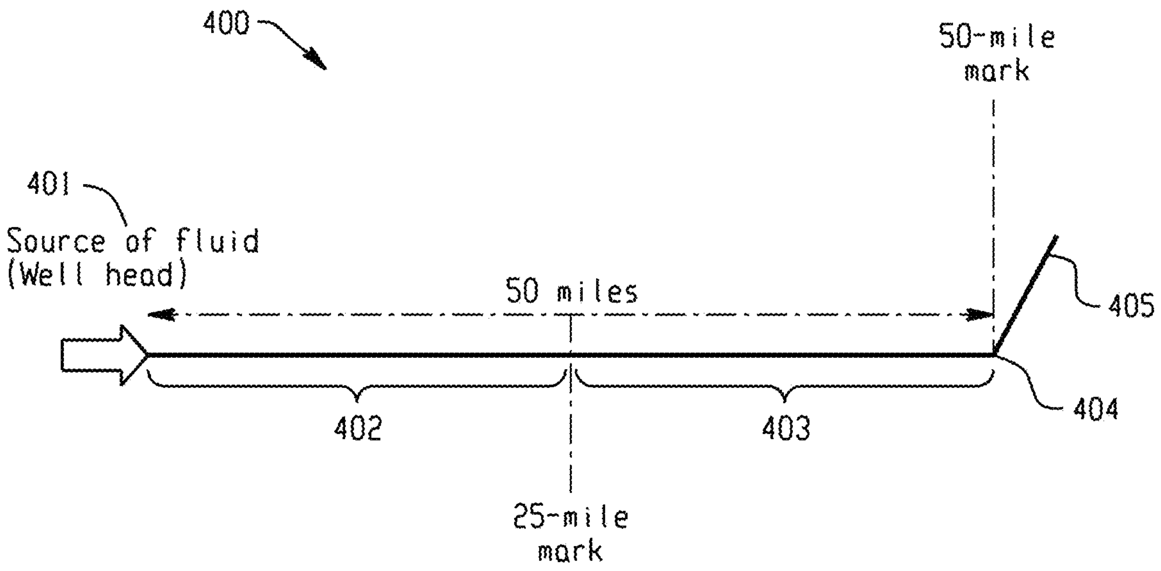
FIG. 4 depicts a heater cable circuit, in accordance with some embodiments.

FIG. 4 depicts a heater cable circuit 400, in accordance with some embodiments. In the example embodiment depicted in FIG. 4, the heater cable circuit 400 includes a first heating circuit 402 that is located near the source of the natural gas or crude oil (e.g., a wellhead) 401. The heater cable circuit 400 may also include a second heating circuit 403 located adjacent to the first heating circuit 402. The first heating circuit 402 and second heating circuit 403 may each be coupled to the renewable energy source 101 and may be wired in series or in parallel. The first and second heating circuits (402, 403) may include one or more heater cables 104. The heater cables 104 of the first and second heating circuits (402, 403) may have differing characteristics (e.g., differing dimensions or differing materials).

There may be several strategic advantages of using two separately powered electrical circuits. For example, the shorter length of each circuit (402, 403) may allow the heater cables 104 to generate higher power density (watts per meter of flowline) without exceeding an upper bound of the operating voltage of the cables. In addition, the electrical independence of the two circuits (402, 403) may allow for different amounts of power density to be generated along different segments of the subsea flowline 103, thereby allowing for power density to be customized to the fluid temperature in the corresponding segment of the flowline. For example, the fluid in the segment of the flowline that is proximal to the wellhead 401 may have sufficiently high temperature that only a fraction (e.g., 60%) of the power density required by the other segment of the flowline would suffice. Alternatively, if the circuit is powered by renewable power, it may be advantageous to generate higher power density than required to maintain adequate flowing temperature and store the excess heat in the soil of the seafloor. The excess heat can then be used when needed, as described further below.

The first heating circuit 402 may make up approximately half of the heater cable circuit 400. In other embodiments, the first heating circuit 402 may be a smaller or larger portion of the overall heater cable circuit 400. In the example embodiment shown in FIG. 4, the heater cable circuit is 50 miles long and the first heating circuit is 25 miles long. The second heating circuit may also occupy approximately half of the heater cable circuit 400. The heater cable circuit may further include an elevating portion 405 that is configured to transport the crude oil or natural gas to a surface location for processing. The elevating portion 405 may be coupled to the second heating circuit 403 at a riser base 404.

Figure 5:
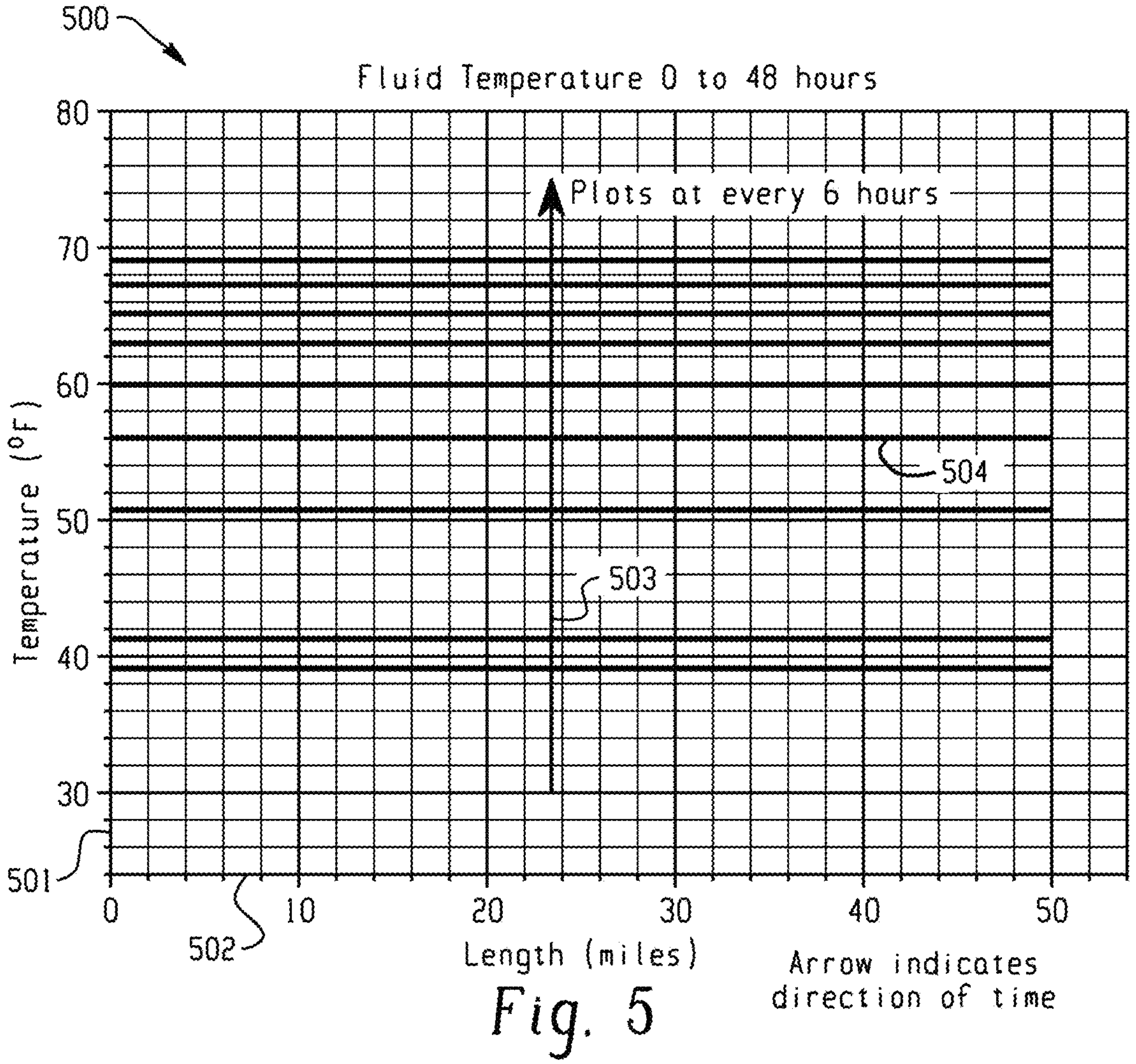
FIG. 5 depicts a graph showing a preheating phase of a subsea flowline, in accordance with some embodiments.

FIG. 5 depicts a graph 500 showing a preheating phase of a subsea flowline 103, in accordance with some embodiments. In one example embodiment, the preheating phase involves heating the subsea flowline 103 when there is no flow of fluid within the subsea flowline 103. In the graph 500 of FIG. 5, the horizontal axis 502 represents the length in miles of a given point from the source of the fluid (e.g., a wellhead). The vertical axis 501 represents the temperature of the given point in degrees Fahrenheit. Each plot 504 represents a set of data points taken at one time. Plots are shown for data obtained every six hours. The time arrow 503 indicates the relative time of each plot with respect to the other plots. For example, each plot 504 includes a collection of data points taken approximately six hours after the data points in the plot directly below it.

As depicted in FIG. 5, the temperature taken at an initial time in the subsea flowline 103 may be approximately 39° F. The heater cables 104 may be turned on at this initial time and may reach full output power within two hours. In one example embodiment, the full output power is approximately 141 watts per meter (W/m). The heater cables 104 may remain powered on until the temperature of the subsea flowline reaches a predetermined temperature. In the example embodiment depicted in FIG. 5, this predetermined temperature is approximately 70° F. This process may take approximately 48 hours. The predetermined temperature may be selected as a tradeoff between using non-renewable energy to reach or exceed a hydrate formation temperature (e.g., 25° C. or 77° F.) to ensure that no or very little hydrate is present at the start of operations, and using less energy to reach a lower temperature that may be approximately adequate to ensure hydrate-free initiation of operations if the operating conditions (e.g., production rate, composition of produced fluid, and fluid temperature) are reasonably close to the expected average. The availability of renewable power renders overheating to even higher temperatures and storing this heat in the soil economically advantageous and ensures that very little or no hydrate is present at the initiation of operations, even under adverse operating conditions.

FIG. **6*a* depicts a graph 600 showing the process of heating fluid within the subsea flowline 103** after the preheating phase and during the early life of steady-state production, in accordance with some embodiments. In the early life of steady-state production, the flow rates may be high (e.g., 40,000 barrels of oil per day), the amount of water in the produced stream may be minimal (e.g., zero to a few percent of the rate of produced liquids), and the temperature of the produced fluids at the wellhead may also be high (e.g., 190° F.). In the late life of steady-state production, the pressure in the reservoir has likely declined and the oil content of the reservoir may be partially depleted. Consequently, the flow rate of oil may have declined (e.g., 10,000 barrels of oil per day), the amount of water in the produced stream may have increased (e.g., 50% of the rate of produced liquids) and the temperature of the produced fluids at the wellhead may have decreased (e.g., 160° F.).

The example embodiment of FIG. **6*a* depicts heating the fluid during a time period from 48 hours to 288 hours. The time periods are taken from the initial time at which the heater cables 104 are turned on. The flow rate of fluid within the subsea flowline may be approximately 40,000 barrels per day (BPD). The water cut may be 0%. The water cut is defined as the ratio of the water which is produced in a well compared to the volume of the total liquids produced. The time arrow 601 indicates the relative time of each plot with respect to the other plots. Each plot in the graph 600 represents a set of calculated points determined for the time approximately 24 hours after the previous plot. The temperature of fluid within the subsea flowline 103 may gradually increase as the heater cables 104 are operated. The renewable energy source 101 may allow the heater cables 104 to heat to temperature levels that would otherwise be economically disadvantageous when conventional energy sources are used, for the cost and efficiency reasons discussed above. As depicted in FIG. 6***a*, the temperature of the fluid near the wellhead may be higher than the temperature of the fluid near the end of the riser base 404.

Figure 6A:
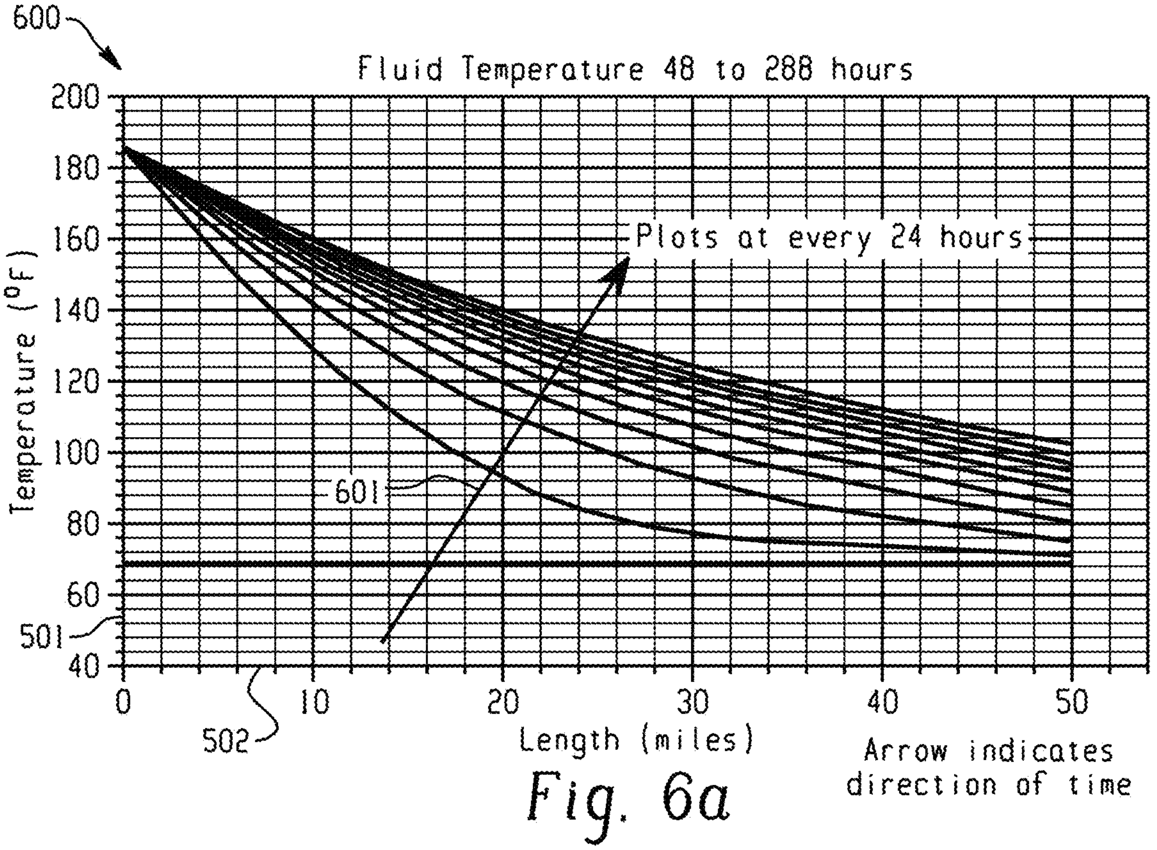
FIG. 6*a* depicts a graph showing the process of heating fluid within the subsea flowline after the preheating phase and during the early life of steady-state production, in accordance with some embodiments.
Figure 6B:
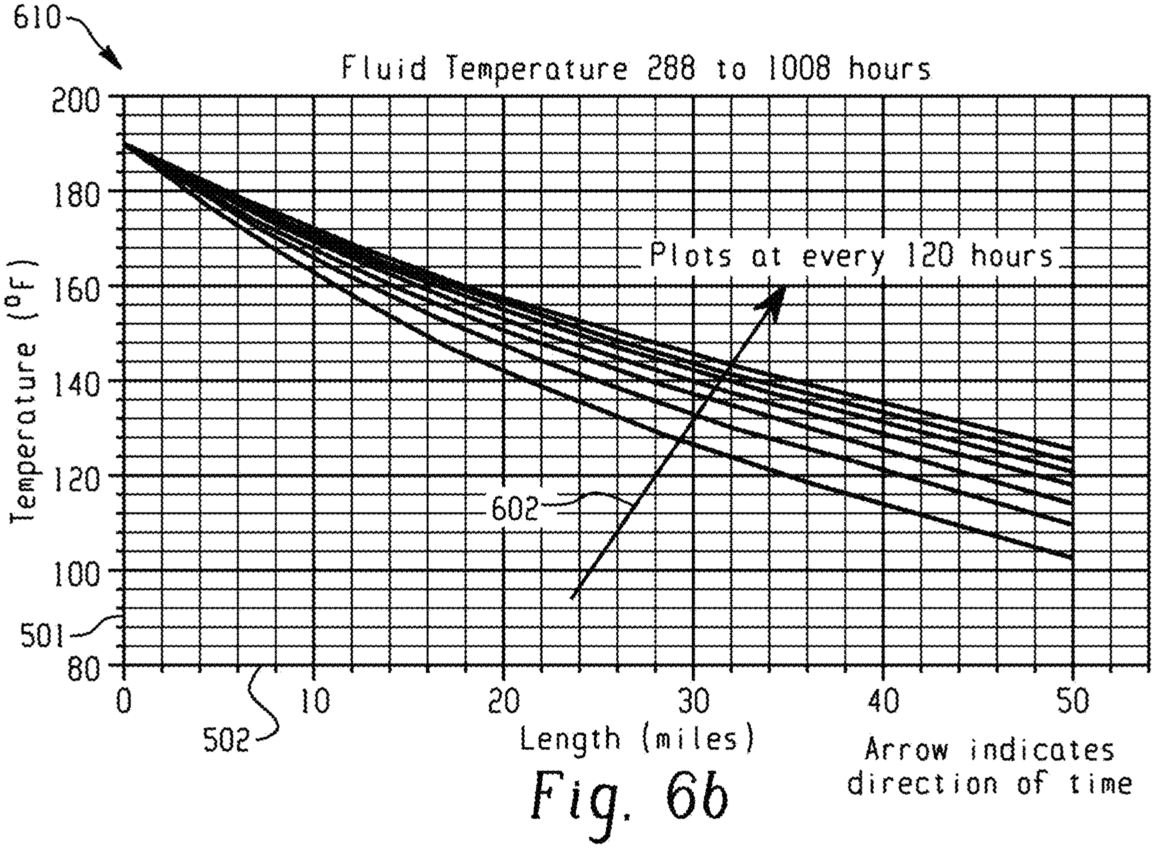
FIG. 6*b* depicts a graph showing the process of heating fluid within the subsea flowline after the last time period represented in FIG. 6*a*, in accordance with some embodiments.

FIG. 6*b* depicts a graph 610 showing the process of heating fluid within the subsea flowline 103 after the last time period represented in FIG. 6*a*, in accordance with some embodiments. The example embodiment of FIG. 6*b* depicts heating the fluid during a time period from 288 hours to 1008 hours. The time periods are taken from the initial time at which the heater cables 104 are turned on. The time arrow 602 indicates the relative time of each plot with respect to the other plots. Each plot in the graph 610 represents a set of data points taken approximately 120 hours after the previous plot. The temperature of fluid within the subsea flowline 103 may gradually increase as the heater cables 104 are operated. As depicted in FIG. 6*b*, the temperature of the fluid near the wellhead may be higher than the temperature of the fluid near the riser base 404.

As noted above, heating the fluid within the subsea flowline 103 can be effective in preventing the formation of hydrates. It may be necessary to heat this fluid to a predetermined temperature to prevent the formation of hydrates. This temperature may be, for example, approximately 80° F. As depicted in FIGS. 6*a* and 6*b*, the fluid within the subsea flowline 103 may be heated to above 100° F. at all portions of the flowline 103. This temperature may also be sufficient to prevent wax formation, which may form within the subsea flowline 103 at temperatures below 80 to 95° F.

Figure 7:
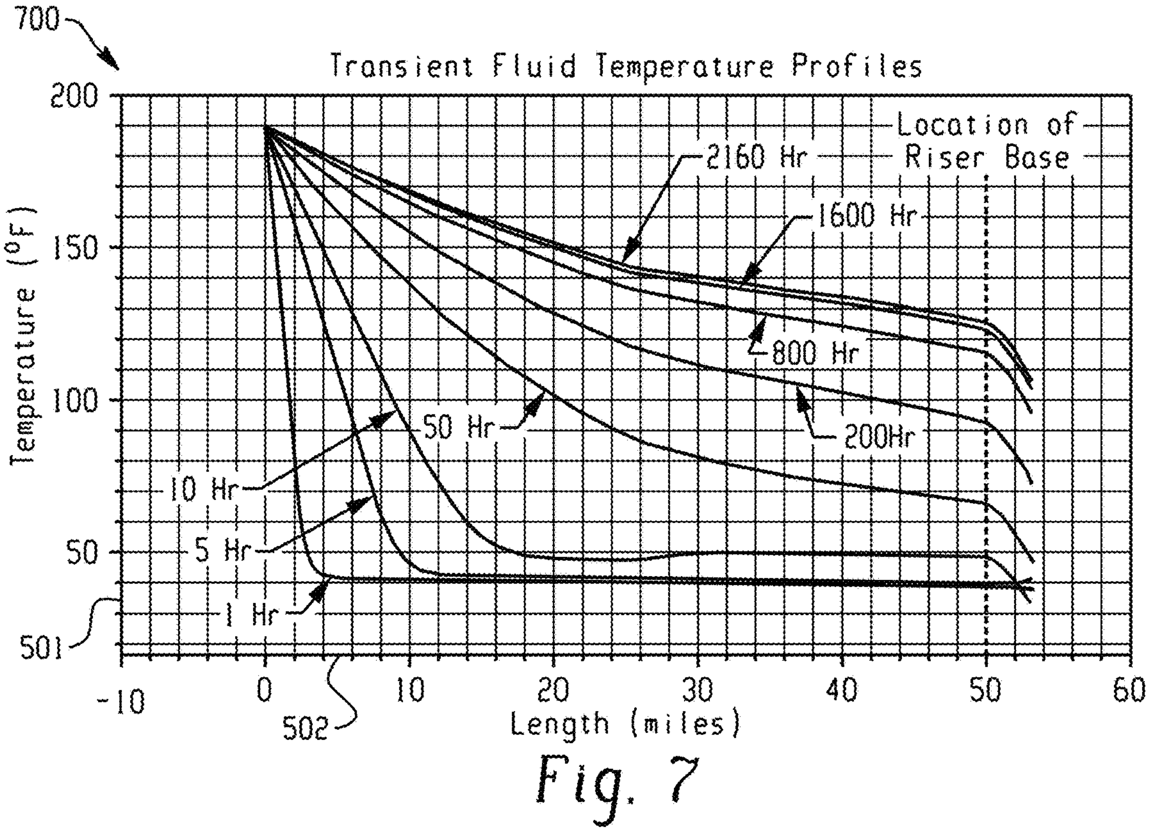
FIG. 7 depicts an operation of the heater cable circuit in which a first heating circuit is operated at 60% capacity and a second heating circuit is operated at 100% capacity, in accordance with some embodiments.

FIG. 7 depicts an operation of the heater cable circuit 400 in which the first heating circuit 402 is operated at 60% capacity and the second heating circuit 403 is operated at 100% capacity, in accordance with some embodiments. In the example embodiment depicted in FIG. 7, the flow rate is 40,000 BPD and the water cut is 0%. The temperature of the fluid within the subsea flowline 103 may be approximately equal to the temperature at the wellhead, which is 190° F. in the example embodiment of FIG. 7. As shown in FIG. 7, the temperature at the riser base 404 may soon reach a level high enough to prevent hydrate formation (e.g., 80° F.) even when the first heater circuit 402 is operated at 60% capacity. The time periods used to label the plots of FIG. 7 (e.g., "1 Hr," "5 Hr") represent the time at which the data points associated with the respective plot were taken relative to the end of the preheating phase. The characteristics of the plots shown in FIG. 7 may change depending on factors including the heating capacity of the heater cables 104, the selected power density of the heater cables, the length of the first and second heating circuits (402, 403), and characteristics of the fluid within the subsea flowline 103.

Figure 8:
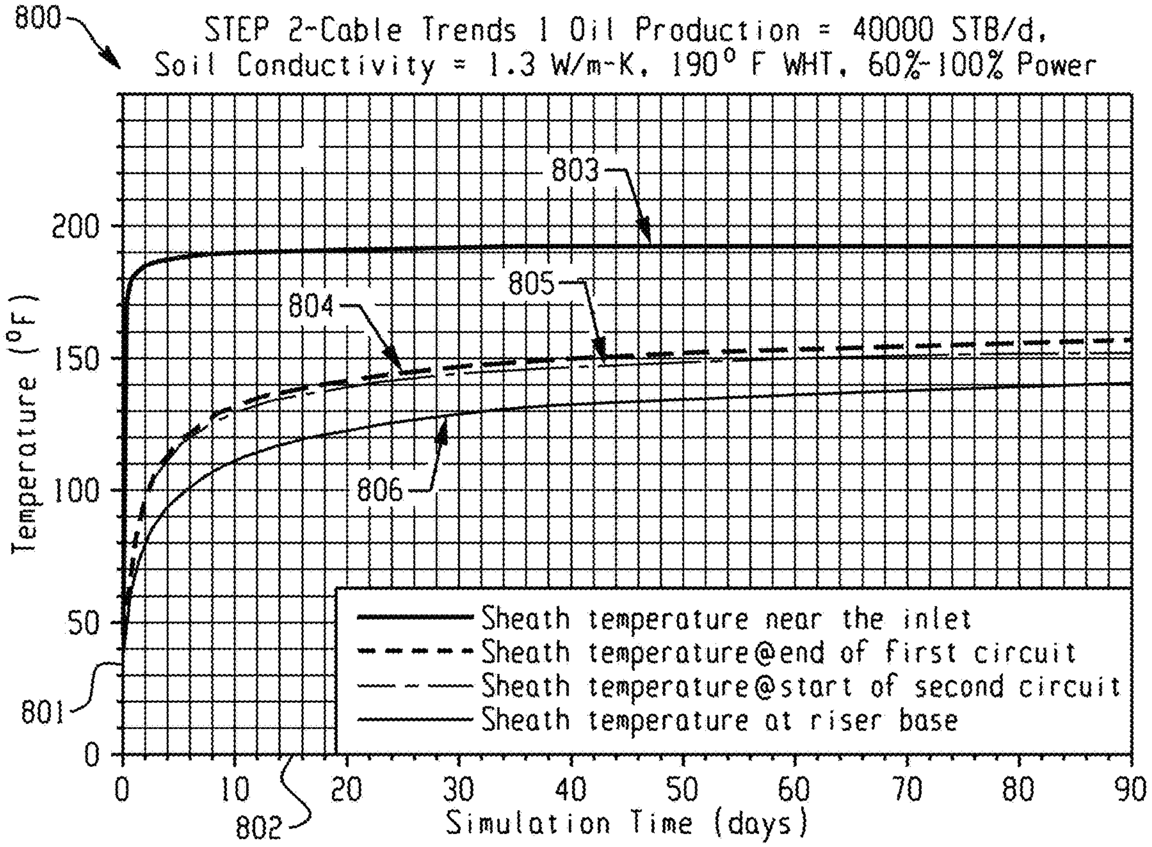
FIG. 8 depicts a relationship between the temperature of the sheath of the heater cables at specific locations and the time the heater cables have been turned on, in accordance with some embodiments.

FIG. 8 depicts a relationship between the temperature 801 of the sheath 303 of the heater cables 104 at specific locations and the time the heater cables 104 have been turned on, in accordance with some embodiments. As shown in FIG. 8, plots are shown for the sheath temperature near the wellhead 803, the sheath temperature at the end of the first heating circuit 804, the sheath temperature at the start of the second heating circuit 805, and the sheath temperature near the riser base 806. The example embodiment depicted in FIG. 8 represents plots in which the flowrate is approximately 40,000 BPD, the soil conductivity is approximately 1.3 watts per meter-Kelvin (W/m×K), the wellhead temperature is approximately 190° F., and the heater cables 104 are operated at 60% to 100% power. The sheath temperature may be limited to a temperature that does not damage the protective coating 307 or other components of the pipe 306.

Figure 9A:
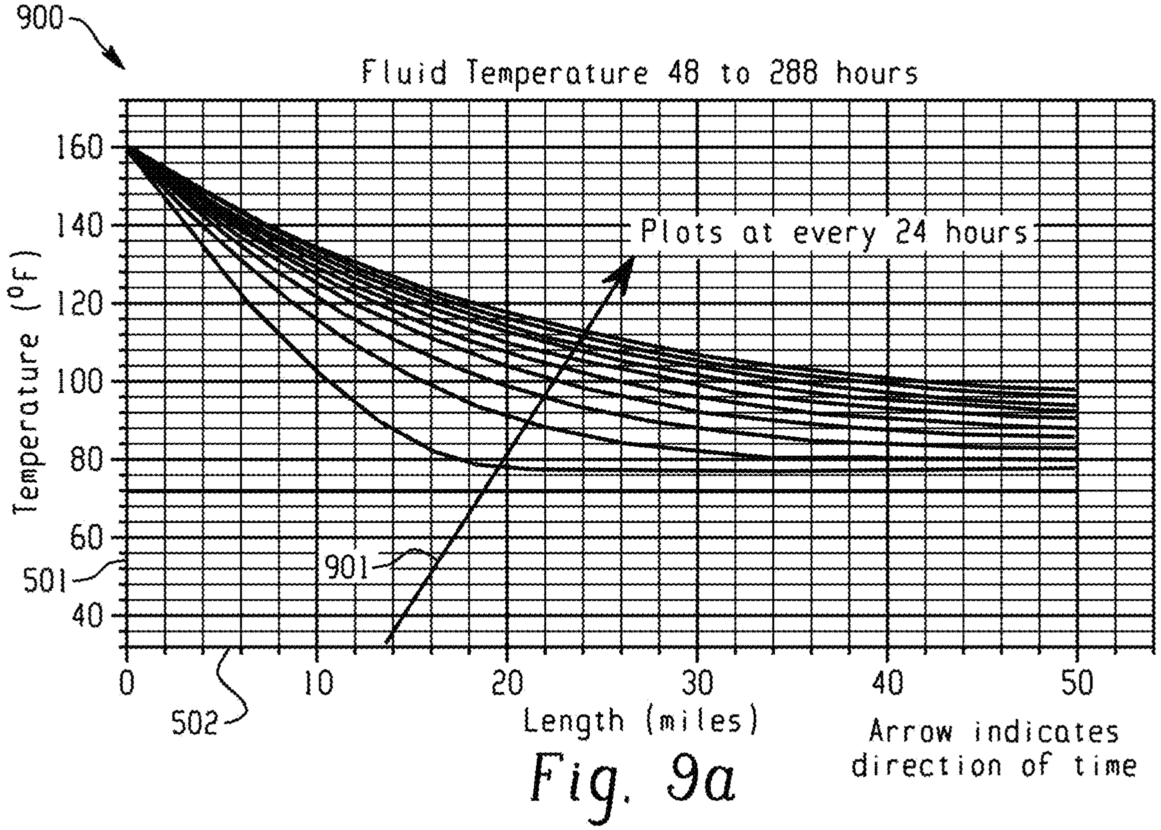
FIG. 9*a* depicts a graph showing the process of heating fluid within the subsea flowline during the late life of steady-state production, in accordance with some embodiments.

FIG. 9*a* depicts a graph 900 showing the process of heating fluid within the subsea flowline 103 during the late life of steady-state production, in accordance with some embodiments. The example embodiment of FIG. 9*a* depicts heating the fluid during a time period from 48 hours to 288 hours. The time periods are taken from the initial time at which the heater cables 104 are turned on. The flow rate of fluid within the subsea flowline may be approximately 10,000 barrels per day (BPD). The water cut may be 50%. The time arrow 901 indicates the relative time of each plot with respect to the other plots. Each plot in the graph 900 represents a set of data points taken approximately 24 hours after the previous plot. The temperature of fluid within the subsea flowline 103 may gradually increase as the heater cables 104 are operated. As depicted in FIG. 9*a*, the temperature of the fluid near the wellhead may be higher than the temperature of the fluid near the end of the riser base 404.

Figure 9B:
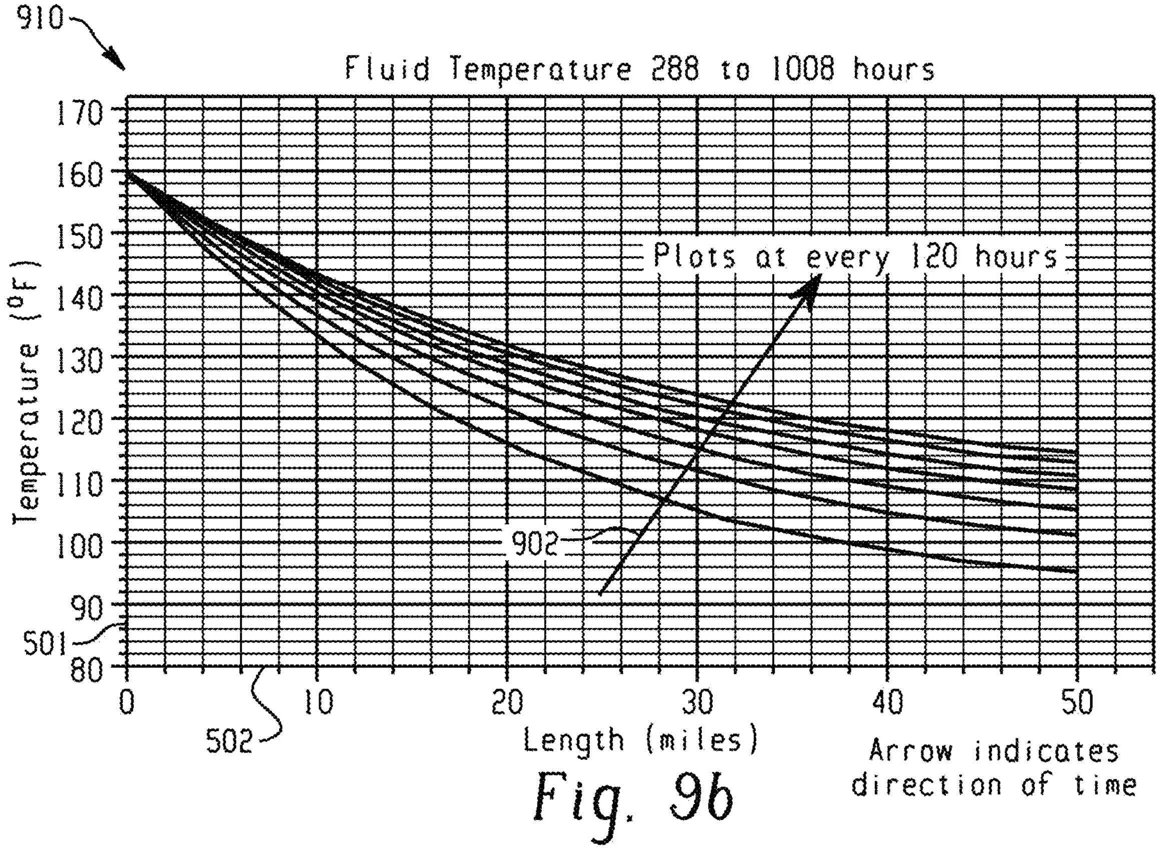
FIG. 9*b* depicts a graph showing the process of heating fluid within the subsea flowline after the last time period represented in FIG. 9*a*, in accordance with some embodiments.

FIG. 9*b* depicts a graph 910 showing the process of heating fluid within the subsea flowline 103 after the last time period represented in FIG. 9*a*, in accordance with some embodiments. The example embodiment of FIG. 9*b* depicts heating the fluid during a time period from 288 hours to 1008 hours. The time periods are taken from the initial time at which the heater cables 104 are turned on. The time arrow 902 indicates the relative time of each plot with respect to the other plots. Each plot in the graph 910 represents a set of data points taken approximately 120 hours after the previous plot. The temperature of fluid within the subsea flowline 103 may gradually increase as the heater cables 104 are operated. As depicted in FIG. 9*b*, the temperature of the fluid near the wellhead may be higher than the temperature of the fluid near the riser base 404.

Figure 10:
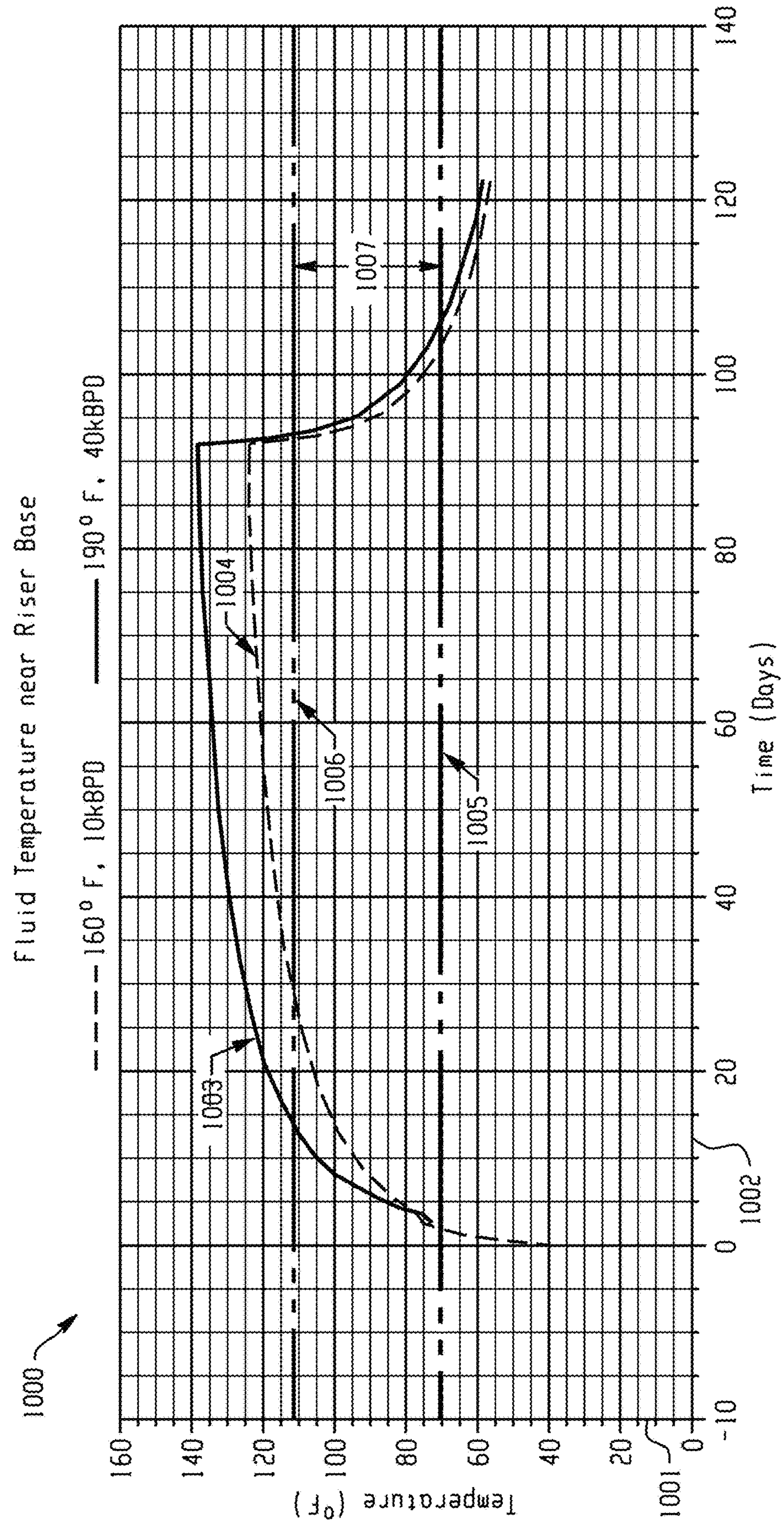
FIG. 10 depicts a graph representing the temperature of fluid within the subsea flowline near the riser base, in accordance with some embodiments.

FIG. 10 depicts a graph 1000 representing the temperature of fluid within the subsea flowline 103 near the riser base 404, in accordance with some embodiments. FIG. 10 shows a plot 1003 of the fluid temperature near the riser base 404 in which the wellhead temperature is approximately 190° F. and the flowrate is approximately 40,000 BPD. FIG. 10 also shows a plot 1004 of the fluid temperature near the riser base 404 in which the wellhead temperature is approximately 160° F. and the flowrate is approximately 10,000 BPD. The heater cables 104 may be heated to a level sufficient to raise the temperature of the fluid within the subsea flowline near the riser base to at least a temperature 1006 that is at least a threshold 1007 above a temperature 1005 at which hydrates form within the fluid. As discussed above in conjunction with FIG. 3, this heating the fluid to this temperature 1006 may be economically disadvantageous when using conventional power sources to heat the heater cables 104, such as fossil fuels. The temperature of the heater cables 104 can be measured from temperature sensors such as optical fibers or thermocouples that can be attached proximally to the cables along the length of the subsea flowline 103. The temperature of the fluids within the subsea flowline 103 can be determined from the measured temperatures using analytical equations of heat transfer or by means of numerical modeling (e.g., computational fluid dynamics).

As depicted in FIG. 10, the fluid temperature may suddenly begin to decrease. This is illustrated as occurring at about 90 days from the heater cables 104 being turned on. The sudden decrease in fluid temperature may result, for example, from power ceasing to be delivered to the heater cables 104 or by the deliberate cessation of production operations due to weather-related events (e.g., hurricanes). As shown in FIG. 10, more than 10 days may pass before the fluid temperature decreases below the temperature 1005 at which hydrate forms within the fluid. This time period may be higher than the time period would be if the heater cables 104 were not strategically overheated according to the systems and methods of the present disclosure. This period of time may be greater depending upon the amount of heat that is stored in the area of the seafloor 106 surrounding the heater cables 104.

Figure 11:
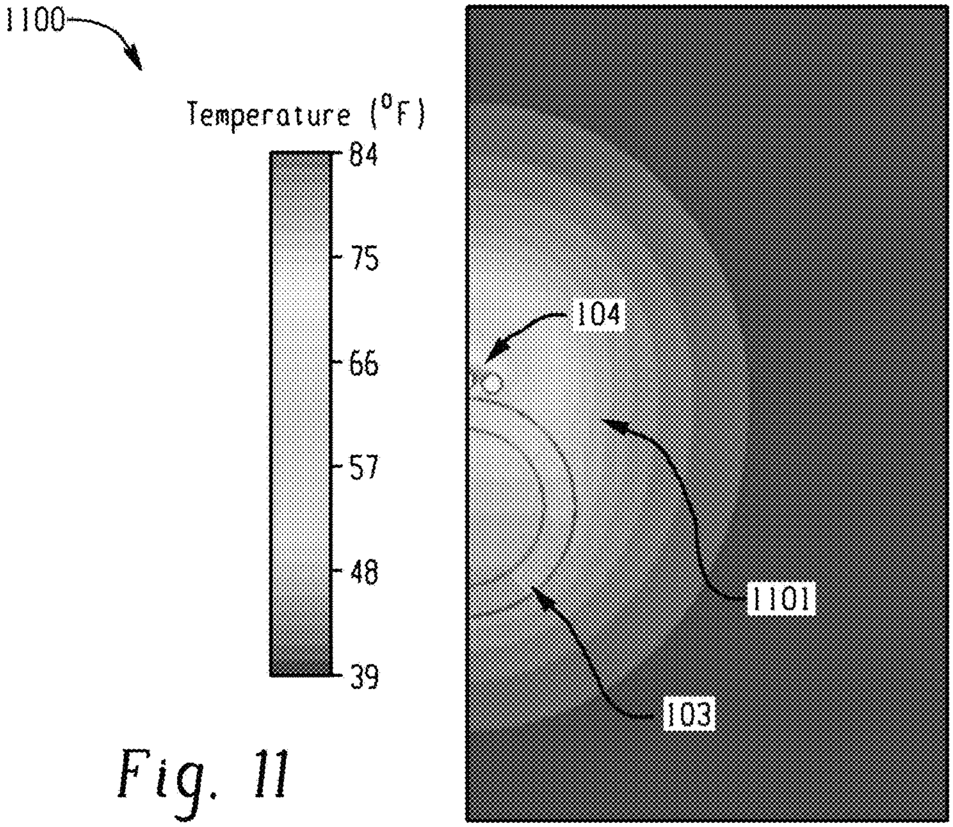
FIG. 11 depicts a calculated heatmap of an area of subsea soil within the seafloor surrounding the heater cables, in accordance with some embodiments.

FIG. 11 depicts a calculated heatmap of an area of subsea soil within the seafloor 106 surrounding the heater cables 104, in accordance with some embodiments. As depicted in FIG. 11, a heat bank 1101 may form surrounding the heater cables 104 and the subsea flowline 103 when the heater cables 104 are strategically overheated. This heat bank may decrease the temperature differential between the subsea flowline 103 and the surrounding seafloor 106. Thus, when the power delivered to the heater cables 104 suddenly decreases or is turned off, the heat bank 1101 can decrease the rate of the flow of heat from the fluid within the subsea flowline 103 to the surrounding seafloor 106. As discussed in conjunction with FIG. 10, this can increase the time that occurs before the fluid within the subsea flowline 103 drops to a temperature at which hydrate forms within the fluid.

Figure 12:
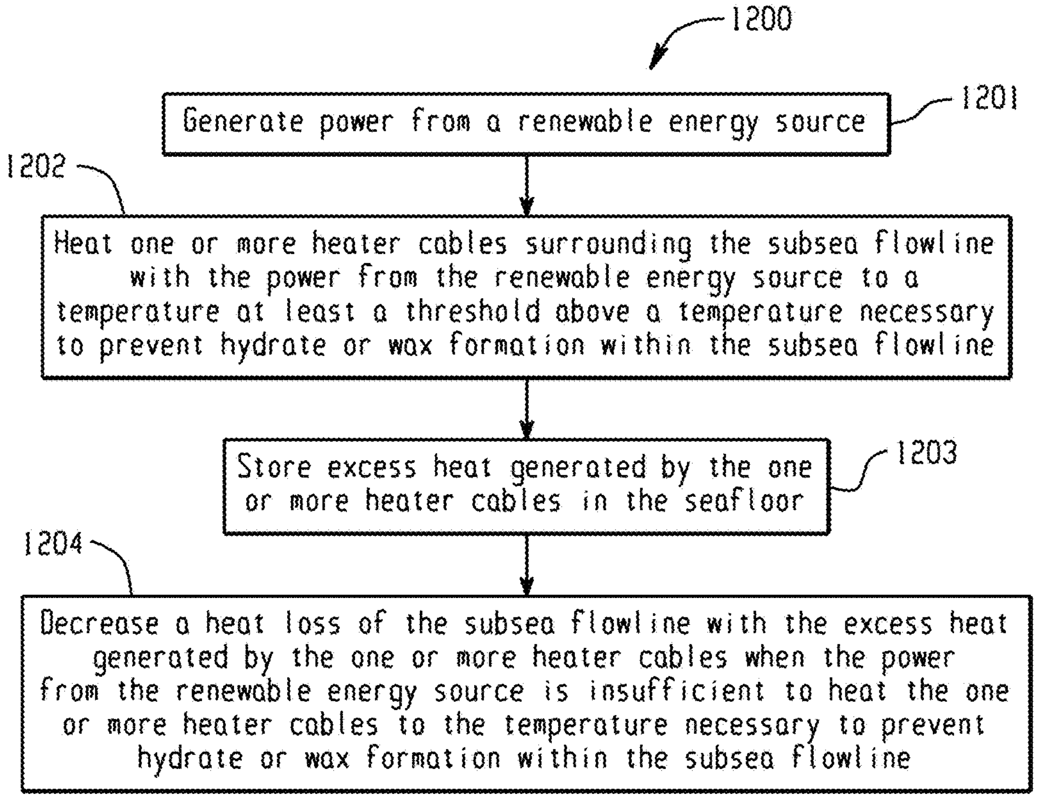
FIG. 12 depicts a method of storing excess heat for subsea flowlines, in accordance with some embodiments.

FIG. 12 depicts a method 1200 of storing excess heat for subsea flowlines, in accordance with some embodiments. In the example embodiment depicted in FIG. 12, the method 1200 may include a first step 1201 of generating power from a renewable energy source. The method 1200 may further include a second step 1202 of heating one or more heater cables surrounding a subsea flowline with the power from the renewable energy source to a temperature at least a threshold above a temperature necessary to prevent hydrate or wax formation within the subsea flowline. The method 1200 may further include a third step 1203 of storing excess heat generated by the one or more heater cables in the seafloor. The method may also include a fourth step 1204 of decreasing a heat loss of the subsea flowline within the excess heat generated by the one or more heater cables when the power from the renewable energy source is insufficient to heat the one or more heater cables to the temperature necessary to prevent hydrate or wax formation within the subsea flowline. In some embodiments within the spirit and scope of the present disclosure, the method 1200 may include performing steps in addition to those expressly recited in FIG. 12. Furthermore, the steps of the method 1200 of the present disclosure may be performed in an order that differs from the order depicted in FIG. 12.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

It is claimed:

1. A system comprising:
- a renewable energy source configured to generate electrical power;
- a subsea flowline buried underneath a surface of a seafloor; and
- one or more heater cables surrounding the subsea flowline, a gap present in the seafloor between the one or more heater cables and the subsea flowline, the one or more heater cables configured to:
  - receive the electrical power from the renewable energy source and heat the subsea flowline to a temperature at least a threshold above a temperature necessary to prevent hydrate or wax formation within the subsea flowline, the heating of the subsea flowline based on the electrical power; and
  - store excess heat generated by the one or more heater cables in a heat bank underneath the surface of the seafloor, the heat bank surrounding the heater cables and the subsea flowline, the excess heat based on heating the subsea flowline to the temperature above the temperature necessary to prevent hydrate or wax formation, the excess heat decreasing a heat loss of the subsea flowline when the power from the renewable energy source is insufficient to heat the one or more heater cables to the temperature necessary to prevent hydrate or wax formation within the subsea flowline.

2. The system of claim 1, the one or more heater cables further configured to limit the temperature of the one or more heater cables to a minimum predetermined temperature that damages the subsea flowline.

3. The system of claim 1, further comprising a sensor configured to generate an alert signal, the alert signal based on a determination that the renewable energy source is not supplying the power necessary to heat the one or more heater cables to the temperature at least the threshold above the temperature necessary to prevent hydrate or wax formation within the subsea flowline.

4. The system of claim 1, wherein the renewable energy source comprises a wind turbine.

5. The system of claim 1, wherein the renewable energy source comprises a solar panel.

6. The system of claim 1, wherein the subsea flowline comprises a hollow region configured to transport natural gas or crude oil, a pipe surrounding the hollow region, and a coating surrounding the pipe, the coating configured to prevent corrosion of the pipe.

7. The system of claim 6, wherein the pipe is a carbon steel pipe.

8. The system of claim 6, further comprising thermal insulation surrounding the subsea flowline.

9. The system of claim 1, wherein the one or more heater cables comprise a core, insulation surrounding the core, and an outer sheath.

10. The system of claim 9, wherein the insulation surrounding the core comprises magnesium oxide.

11. A method of storing excess heat for subsea flowlines comprising:
- generating power from a renewable energy source;
- heating one or more heater cables surrounding a subsea flowline buried beneath a surface of a seafloor with the power from the renewable energy source to a temperature at least a threshold above a temperature necessary to prevent hydrate or wax formation within the subsea flowline, wherein a gap is present between the one or more heater cables and the subsea flowline;

storing excess heat generated by the one or more heater cables in a heat bank underneath the surface of the seafloor, the heat bank surrounding the one or more heater cables and the subsea flowline; and decreasing a heat loss of the subsea flowline with the excess heat generated by the one or more heater cables when the power from the renewable energy source is insufficient to heat the one or more heater cables to the temperature necessary to prevent hydrate or wax formation within the subsea flowline.

12. The method of claim 11, further comprising limiting the temperature of the one or more heater cables to a minimum predetermined temperature that damages the subsea flowline.

13. The method of claim 12, wherein the one or more heater cables comprise a core, insulation surrounding the core, and an outer sheath.

14. The method of claim 13, wherein the insulation surrounding the core comprises magnesium oxide.

15. The method of claim 11, further comprising detecting that the renewable energy source is not supplying the power necessary to heat the one or more heater cables to a temperature at least the threshold above a temperature necessary to prevent hydrate or wax formation.

16. The method of claim 11, wherein the renewable energy source comprises a wind turbine.

17. The method of claim 11, wherein the renewable energy source comprises a solar panel.

18. The method of claim 11, wherein the subsea flowline comprises a hollow region configured to transport natural gas or crude oil, a pipe surrounding the hollow region, and a coating surrounding the pipe, the coating configured to prevent corrosion of the pipe.

19. The method of claim 18, wherein the pipe is a carbon steel pipe.

20. The method of claim 18, wherein thermal insulation surrounds the subsea flowline.

* * * * *